United States Patent [19]

Mauro

[11] Patent Number: 5,207,964
[45] Date of Patent: May 4, 1993

[54] METHOD FOR MANUFACTURING A PLASTIC HOLLOW PRODUCT USING WATER SOLUBLE RESIN

[76] Inventor: James J. Mauro, 19 E. Heritage Dr., Chatham, N.J. 07928

[21] Appl. No.: 654,875

[22] Filed: Feb. 13, 1991

[51] Int. Cl.$^5$ .............................................. B29C 33/40
[52] U.S. Cl. ................................... 264/221; 156/155; 156/304.2; 156/305; 264/317; 264/328.8; 264/328.14
[58] Field of Search ................... 264/23, 221, 248, 317, 264/DIG. 44, 211.23, 328.8, 328.14; 156/145, 155, 292, 305, 304.2, 304.6; 425/145, 149, 208

[56] References Cited

U.S. PATENT DOCUMENTS

| | | | |
|---|---|---|---|
| 2,280,074 | 4/1942 | Halsall | 264/317 |
| 2,285,502 | 6/1942 | Dreyfus | 264/317 |
| 2,975,823 | 3/1961 | Ponnock | 136/304.2 |
| 3,767,740 | 10/1973 | Jones-Hinton et al. | 156/292 |
| 4,137,117 | 1/1979 | Jones | 156/305 |
| 4,174,365 | 11/1979 | Pahl | 264/146 |
| 4,181,549 | 1/1980 | McPhee | 156/305 |
| 4,311,446 | 1/1982 | Hold et al. | 425/145 |
| 4,329,313 | 5/1982 | Miller et al. | 264/211.23 |
| 4,648,827 | 3/1987 | Laimer et al. | 425/208 |
| 4,651,382 | 3/1987 | Krolick | 156/305 |
| 4,741,685 | 5/1988 | Inaba et al. | 425/145 |
| 4,755,122 | 7/1988 | Schmidt | 425/145 |
| 4,988,273 | 1/1991 | Faig et al. | 425/149 |
| 5,030,395 | 7/1991 | Kamiguchi et al. | 425/145 |

FOREIGN PATENT DOCUMENTS

| | | | |
|---|---|---|---|
| 436045 | 8/1948 | Italy | 264/317 |
| 54-53168 | 4/1979 | Japan | 264/317 |
| 55-90323 | 7/1980 | Japan | 156/304.2 |
| 58-147333 | 9/1983 | Japan | 264/317 |
| 7611387 | 4/1978 | Netherlands | 156/304.2 |
| 724465 | 2/1955 | United Kingdom | 156/305 |

OTHER PUBLICATIONS

*Modern Plastics Intl.*, Nov. 1989, pp. 7–8.

*Primary Examiner*—Jay H. Woo
*Assistant Examiner*—Robert B. Davis
*Attorney, Agent, or Firm*—Majestic, Parsons, Siebert & Hsue

[57] ABSTRACT

A method for manufacturing a plastic hollow product with complicated geometry using water soluble resin. The method includes the steps of making a half shell of the core out of the water soluble resin, joining the half shells together into a piece by solvent welding, ultrasonic welding, vibration welding, or the like, overmolding the core with water resistant resin, and dissolving the core away from the overmolded product by spraying hot water thereto. The injection conditions such as injection time, injection speed, and injection pressure are varied in the respective zone which is divided into several divisions by same distance in the injection cylinder. Therefore, injection procedure is performed in a stepwise manner to make a hollow product.

14 Claims, 2 Drawing Sheets

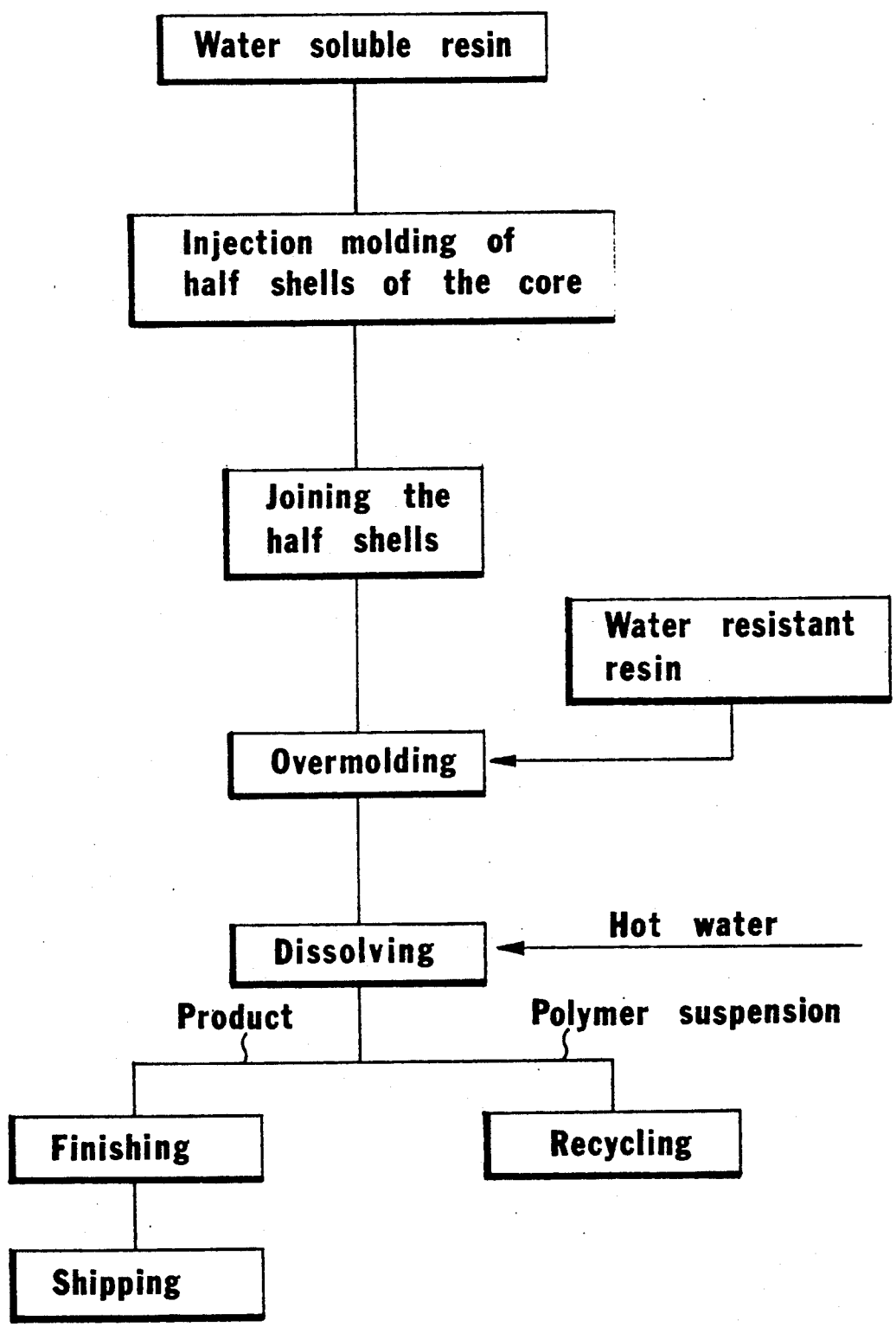
FIG._1.

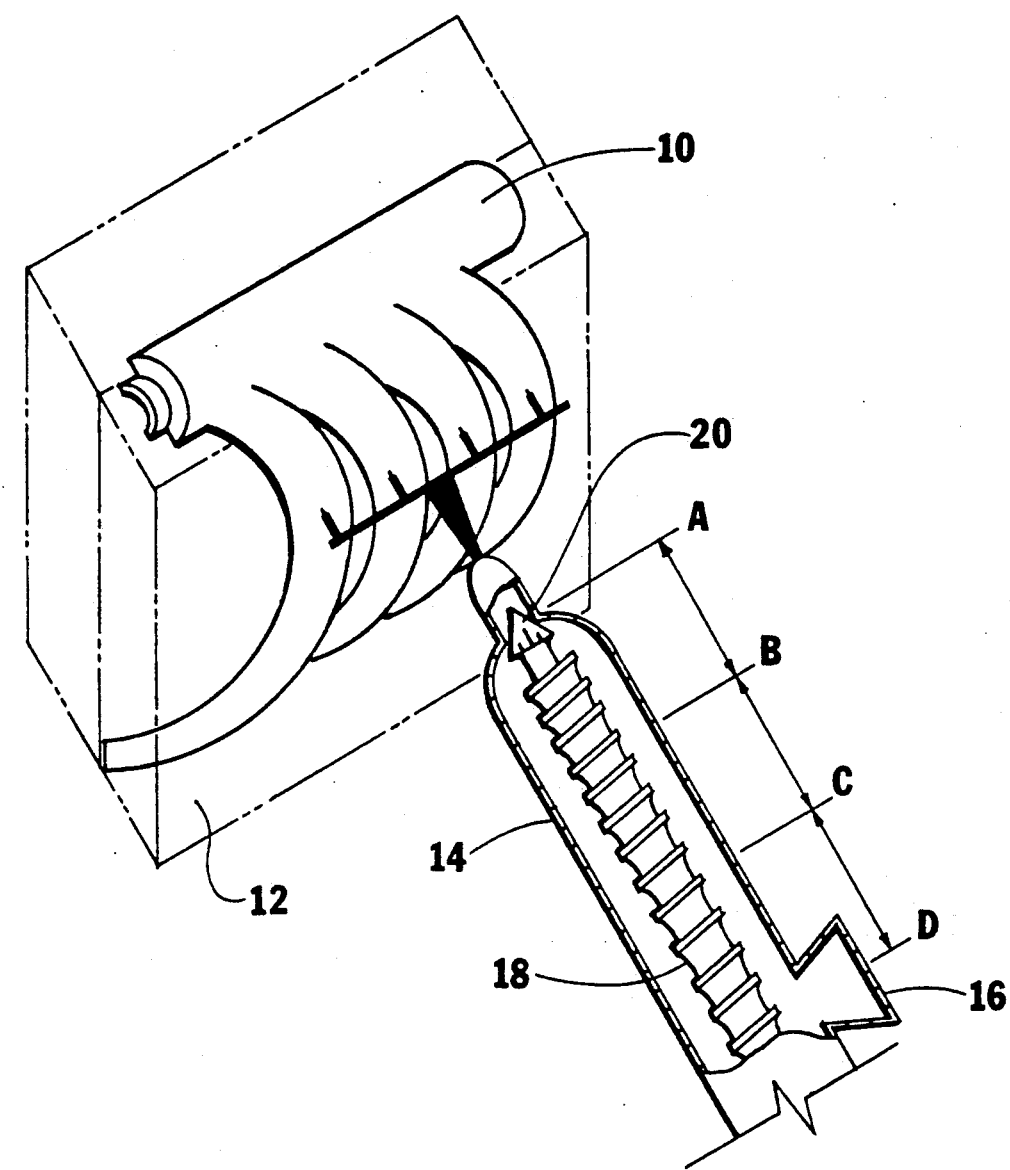
FIG._2.

METHOD FOR MANUFACTURING A PLASTIC HOLLOW PRODUCT USING WATER SOLUBLE RESIN

FIELD OF THE INVENTION

The present invention relates to a method for manufacturing a plastic hollow product using water soluble resin. More particularly, it is concerned with a method for manufacturing a plastic hollow product with complex geometries, by means of injection molding the water soluble resin into a mold cavity, overmolding it with water resistant resin, and then dissolving the core resin with deionized water.

BACKGROUND OF THE INVENTION

The most well known method for manufacturing hollow products up to the present time is hollow-molding. By this method, however, it is difficult to manufacture products with complicated geometries such as, for example, automotive intake manifold having a plurality of curved passages, because of the fact that the structure of the die which can be used in this method should not be that complicated.

On the other hand, there has been an attempt to manufacture hollow products with complicated geometries by injection molding out of heat resisting polymers or water resistant polymers such as PE, PP, PS, or the polymers which are made by adding to said heat resisting polymer fillers such as glass fiber, carbon fiber, carbon tarch, or calcium carbonate in order to reduce weight of the products. However, the above described obstructions in hollow-molding still remain. Therefore, there is no other method but making such products out of metallic materials such as aluminum by metal casting.

To this end, Belland AG of Switzerland suggest a method for manufacturing a plastic air intake manifold or the like using lost core technique in the Journal of Modern plastics International, November, 1990, where they cannot disclose the method with satisfaction.

SUMMARY OF THE INVENTION

Having in mind the defects in manufacturing hollow products by prior art, it is an object of the present invention to provide novel method for manufacturing a plastic hollow product with complicated inner or outer geometries with great ease by using water soluble resin.

It is another object of the present invention to provide a method which can contribute to reducing weight of the products, cutting cost for manufacturing the same, and having suitable characteristics for mass production.

It is still another object of the present invention to provide a method in which the water soluble resin can be recycled and reused after being dissolved.

Hence, the method for manufacturing a plastic hollow product of the present invention with regard to said objects comprises the steps of: making a separate half-shell of a core (referred to a upper core and a lower core hereinafter) by injection molding procedure, where the injection operation is performed with several stages, and joining the upper and the lower core into one piece, by spreading a hydrophilic OH-polar solvent such as water or methyl-alcohol on the contacting surfaces of said upper and lower core, and then drying them for 1 to 24 hours with applying pressure of 30 to 140 lb/in$^2$ thereon; making an overmolded product by inserting said core into a mold cavity, injecting water resistant resin at high pressure so as to be overmolded around said core, and cooling the overmolded product; and dissolving said water soluble resin out of said overmolded product by spraying hot water heated by heating means.

In another embodiment of the invention, said core is able to be made by blow molding method using oxygen or inert gas such as nitrogen into the molten core at high pressure.

By way of example and to make the description more clear, reference is made to the accompanying drawing in which:

BRIEF DESCRIPTION OF THE DRAWING

FIG. 1 is a flow diagram showing the method for manufacturing a plastic hollow product in accordance with the invention.

FIG. 2 is a schematic partially broken perspective view showing a injection procedure for manufacturing a plastic hollow product in accordance with the invention.

DETAILED DESCRIPTION OF THE PREFERRED EMBODIMENT

An embodiment of the invention will now be described in details with reference to the accompanying drawing.

Water soluble resin composed of a predetermined composition in alkyl-group resin is injected into a mold cavity of pair of dies having specific geometry to make a half shell of the core, i.e., an upper core and a lower core, and then the upper and the lower core are joined together.

In joining the upper and the lower core, various joining methods can be used such as solvent welding, ultrasonic welding, or vibration welding, which will now be described.

According to solvent welding, the core can be obtained by the method comprising the steps of spreading a small quantity of solvent like water on the contacting surfaces of the upper and the lower core, respectively, and then drying the joined core for 1 to 24 hours with applying pressure of 30 to 140 psi thereon.

The method according to ultrasonic welding comprises the steps of forming a protrusion on the upper core, contacting the protrusion of the upper core onto the surface of the lower core, and then applying an electric current of which the frequency is in the range from 20,000 Hz to 40,000 Hz, whereby an instant frictional heat on the contacting surfaces of the upper and the lower core is caused to melt said protrusion and the upper and the lower core can be joined in-to the core with melted resin.

The method according to vibration welding comprises the steps of contacting the surfaces of the upper and the lower core tightly at given pressure and generating a frictional heat on the surfaces by giving vibration of frequency about 1/6 inch, whereby the surfaces of each half cores are fused to be joined together.

On the other hand, it is also possible to make an injection molded core without making the upper and the lower core, respectively by the gas assisted injection molding method comprising the steps of mounting a nozzle of an gas injection apparatus at the injection molding machine which is able to inject oxygen or inert gas such as nitrogen at the pressure of about 300 to 400 psi, injecting (short-shotting) the water soluble resin into a die cavity, stopping the molding operation for an instant, and injecting said gas at high pressure through said nozzle before the water soluble resin filled within the die cavity gets hardened, and thereby the molten resin can be flowed to the most stable direction where the favorable stress or flow resistance distribution can be obtained to form into a hollow core having uniform wall thickness.

The hollow core made by the above mentioned methods is then inserted into a mold cavity of an injection molding die, supported tightly with a clamp, and then water resistant resin is injected at high pressure for being overmolded around the core. An overmolded core product thus made is extracted from the mold cavity after cooling.

Inside of the overmolded hollow product, there must be the core made out of the water soluble resin. Accordingly, as a final step, after fixing the overmolded hollow product in a dissolving apparatus, the water soluble resin is dissolved away by spraying hot water of temperature 190° to 200° F. through a nozzle.

The whole process for manufacturing a plastic hollow product is thus completed only after finishing procedure by trimming the unnecessary parts which are formed on the inner or outer side of the product during molding procedure.

EXAMPLE

Now, one example of the present invention will be described as follows.

Referring to FIG. 2, a mold cavity 10 of a mold 12 is preheated by hot water, mineral oil or the like to a temperature of 120° F. to 180° F. for injecting core material and 140° F. to 220° F. for overmolding, respectively. The material used for making a core is alkyl-group water soluble resin and is dried at a temperature of 190° F. for about 4 hours with hot air, or vacuum drying method. On the other hand, the material used for overmolding procedure is water resistant resin which is dried at the temperature of 170° F. for about 2 hours. This resin is introduced into a injection cylinder 14 through a feed hopper 16 for molding procedure.

The injection conditions are prepared as shown at Table 1 to 4 by indicating reference numerals A, B, C, and D at a position of a injection cylinder 14 including a screw 18, where entire length of the injection cylinder 14 is divided into three zones from a nozzle 20 to the feeding hopper 16 by same distance as shown in FIG. 2. Respective processing temperature, injection time, injection speed, or injection pressure at each zone is capable of being selected or varied in the range of the values at Table 1 to 4 corresponding to the size and volume of the product.

At first, injection process for making a upper core will be explained; the injection cylinder 14 is heated to a certain temperature by a auxiliary heater (not shown) thereof and each position of the injection cylinder 14 is maintained in the temperature as shown at Table 1.

TABLE 1

|  | Processing Temperature (°F.) | | | |
| --- | --- | --- | --- | --- |
|  | A | B | C | D |
| Upper core molding | 430 | 350 | 350 | 290 |
| Lower core molding | 430 | 350 | 350 | 290 |
| Overmolding | 580 | 570 | 460 | 480 |

The screw 18 of the injection cylinder 14 is driven intermittently to push the molten resin toward the nozzle 14 in a step wise manner, where respective injection time at each zone is as shown at Table 2, and respective injection speed is as illustrated at Table 3.

TABLE 2

|  | Injection Time (sec) | | |
| --- | --- | --- | --- |
|  | A-B | B-C | C-D |
| Upper core molding | 25 to 90 | 5 to 15 | 100 to 340 |
| Lower core molding |  |  |  |
| Overmolding | 20 | 200 | 30 |

TABLE 3

|  | Injection Speed (%) | | |
| --- | --- | --- | --- |
|  | A-B | B-C | C-D |
| Upper core molding | 60 to 72 | 87 to 92 | 87 to 93 |
| Lower core molding |  |  |  |
| Overmolding | 78 | 99 | 98 |

The injection speed is indicated by percent ratio in which the maximum injection speed of the injection molding machine is regarded as 100 percent with respect to the injection stroke.

The injection pressure supplied during the injection procedure related to the injection time is as shown at Table 4, which is divided into 3 group of the pressure zone on the basis of the injection time.

TABLE 4

|  | Injection Pressure (%) | | |
| --- | --- | --- | --- |
|  | A-B | B-C | C-D |
| Upper core molding | 72 to 90 | 77 to 85 | 72 to 86 |
| Lower core molding |  |  |  |
| Overmolding | 98 | 99 | 80 |

In the injection procedure, some back-up pressure is added corresponding to the injection pressure so as to satisfactorily perform the injection molding procedure.

The lower core having different size and volume thereof is injection molded by the same method as described above, except the injection conditions of properly selected value at Table 1 to 4. Therefore, we will omitt the detailed descriptions thereof.

Next, the upper core and the lower core manufactured as above are joined into one piece by spreading a hydrophilic OH-polar solvent, and, in another embodiment of the invention, by applying a ultrasonic welding method or a vibration welding method. Inserting the joined core into a mold cavity, and then overmolding water resistant resin around the core according to the processing conditions as shown at Table 1 to 4.

Likewise, the overmolding procedure is performed in a stepwise manner as illustrated in core molding procedure. When the resin of the core in the mold cavity becomes hardened, the product is picked out from the mold cavity and transferred to a dissolving procedure where the core made of water soluble resin is washed out with hot water or some solution to produce a hollow product.

The above described method of the present invention is highly useful for making hollow products with complicated geometries such as automotive intake manifolds households, ducts or the like. Further, it can contribute to cutting cost for manufacturing and mass-production, not to speak of being able to reducing weight of the products in comparison with the conventional method using metallic material.

Although certain specific embodiments of the present invention have been described and shown above, it is to be understood that many modifications are possible. The invention, therefore, is not to be restricted except insofar as is necessitated by the prior art and by the spirit of the appended claims.

What is claimed is:

1. A method for manufacturing a plastic hollow core product using water soluble resin, which comprises the steps of:

making first and second half shells of a high temperature resistant core by an injection molding process which employs an elongated injection cylinder having an inlet end and an outlet end, whereby for preparing each half shell said injection molding process comprises of: (1) heating the elongated injection cylinder to cause a temperature gradient along the elongated injection cylinder wherein the temperature at the inlet end is lower than the temperature at the outlet end; and (2) introducing water soluble resin through said injection cylinder and into a first mold cavity in a stepwise manner such that injection time, injection speed, and injection pressure through the elongated injection cylinder can be regulated;

joining said half shells together into one piece by spreading a solvent on the contacting surfaces of said half shells and then drying the joined core for approximately 1 to 24 hours while applying pressure of approximately 30 to 140 psi thereon;

making an overmolded core product by positioning said core into a second mold cavity, and thereafter injecting under high pressure a water resistant resin around said core by a process which employs the elongated injection cylinder, whereby the step of injecting said water resistant resin comprises of: (1) heating the elongated injection cylinder to cause a temperature gradient along the elongated injection cylinder wherein the temperature at the inlet is lower than the temperature at the outlet; and (2) introducing said resistant resin through said injection cylinder and into the second mold cavity in a stepwise manner such that injection time, injection speed, and injection pressure through the elongated injection cylinder can be regulated and then cooling the overmolded core product; and dissolving said water soluble resin from said overmolded core product with hot water.

2. A method as claimed in claim 1, wherein the injection process step for making each half shell of the core comprises of (1) employing an elongated injection cylinder having a length of distance L wherein the elongated injection cylinder defines first, second, third, and fourth positions along its length, wherein the second position is ⅛ L from the first position and the third position is ⅛ L from the second position, wherein the first position is at or near the outlet end, and the fourth position is at or near the inlet end, and the second and third positions are located between the first and fourth positions such that the first, second, third, and fourth position define first, second, and third zones, with the first zone being defined as a portion of the cylinder between the first and second positions, the second zone being defined as a portion of the cylinder between the second and third position, and the third zone being defined as the portion of the cylinder between the third and fourth positions, and (2) heating the elongated injection cylinder at the first, second, third, and fourth positions to a temperature of about 430° F., 350° F., 350° F., and 290° F., respectively, and wherein the step of making the overmolded core product further includes heating the elongated injection cylinder at the first, second, third, and fourth positions to a temperature of about 580° F., 570° F., 460° F., and 480° F., respectively.

3. A method as claimed in claim 2, wherein the step of making each half shell comprises of varying the injection time in the first zone from approximately 25 to 90 seconds and wherein the step of making the overmolded core comprises of injecting the water resistant resin through the first, second, and third zones at approximately 20 seconds, 200 seconds, and 30 seconds, respectively.

4. A method as claimed in claim 3, wherein the step of making each half shell comprises of varying the injection time in the second zone from approximately 5 to 15 seconds.

5. A method as claimed in claim 4, wherein the step of making each half shell comprises of varying the injection time in the third zone from approximately 100 to 340 seconds.

6. A method as claimed in claim 3, wherein the step of making each half shell comprises of employing an injection molding machine capable of a maximum injection speed and varying the injection speed in the first zone from approximately 60 to 72 percent with respect to the maximum injection speed of the injection molding machine and wherein the step of making the overmolded core comprises of maintaining an injection speed through the first, second, and third zones at approximately 78, 99, and 98 percent with respect to the maximum injection speed, respectively.

7. A method as claimed in claim 6, wherein the step of making each half shell comprises of employing an injection molding machine capable of a maximum injection speed and varying the injection speed in the second zone from approximately 87 to 92 percent with respect to the maximum injection speed of the injection molding machine.

8. A method as claimed in claim 7, wherein the step of making each half shell comprises of employing an injection molding machine capable of a maximum injection speed and varying the injection speed in the third zone from approximately 87 to 93 percent with respect to the maximum injection speed of the injection molding machine.

9. A method as claimed in claim 2, wherein the step of making each half shell comprises of employing an elongated injection cylinder capable of a maximum injection pressure and varying the injection pressure applied in the first zone from approximately 72 to 90 percent with respect to the maximum injection pressure of the injection molding machine and wherein the step of making the overmolded core comprises of maintaining the injection pressure through the first, second, and third zones at approximately 98, 99, and 80 percent with respect to the maximum injection pressure, respectively.

10. A method as claimed in claim 9, wherein the step of making each half shell comprises of employing an injection molding machine capable of a maximum injection pressure and varying the injection pressure applied in the second zone from approximately 77 to 85 percent with respect to the maximum injection pressure of the injection molding machine.

11. A method as claimed in claim 10, wherein the step of making each half shell comprises of employing an injection molding machine capable of a maximum injection pressure and varying the injection pressure applied in the third zone from approximately 72 to 86 percent with respect to the maximum injection pressure of the injection molding machine.

12. The method as defined in claim 1 wherein the step of joining the half shells comprises of spreading water onto the contacting the surfaces of said half shells.

13. The method as defined in claim 1 wherein the step of joining the half shells comprises of spreading alcohol onto the contacting the surfaces of said half shells.

14. The method as defined in claim 1 wherein the step of joining the half shells comprises of spreading methyl alcohol onto the contacting the surfaces of said half shells.

* * * * *

UNITED STATES PATENT AND TRADEMARK OFFICE
CERTIFICATE OF CORRECTION

PATENT NO. : 5,207,964
DATED : May 4, 1993
INVENTOR(S) : James J. Mauro

It is certified that error appears in the above-indentified patent and that said Letters Patent is hereby corrected as shown below:

Column 6, line 25, in claim 6:   Replace "claim 3" with --claim 2--

Signed and Sealed this

Fourth Day of January, 1994

Attest:

BRUCE LEHMAN

Attesting Officer    Commissioner of Patents and Trademarks